Figure 1:
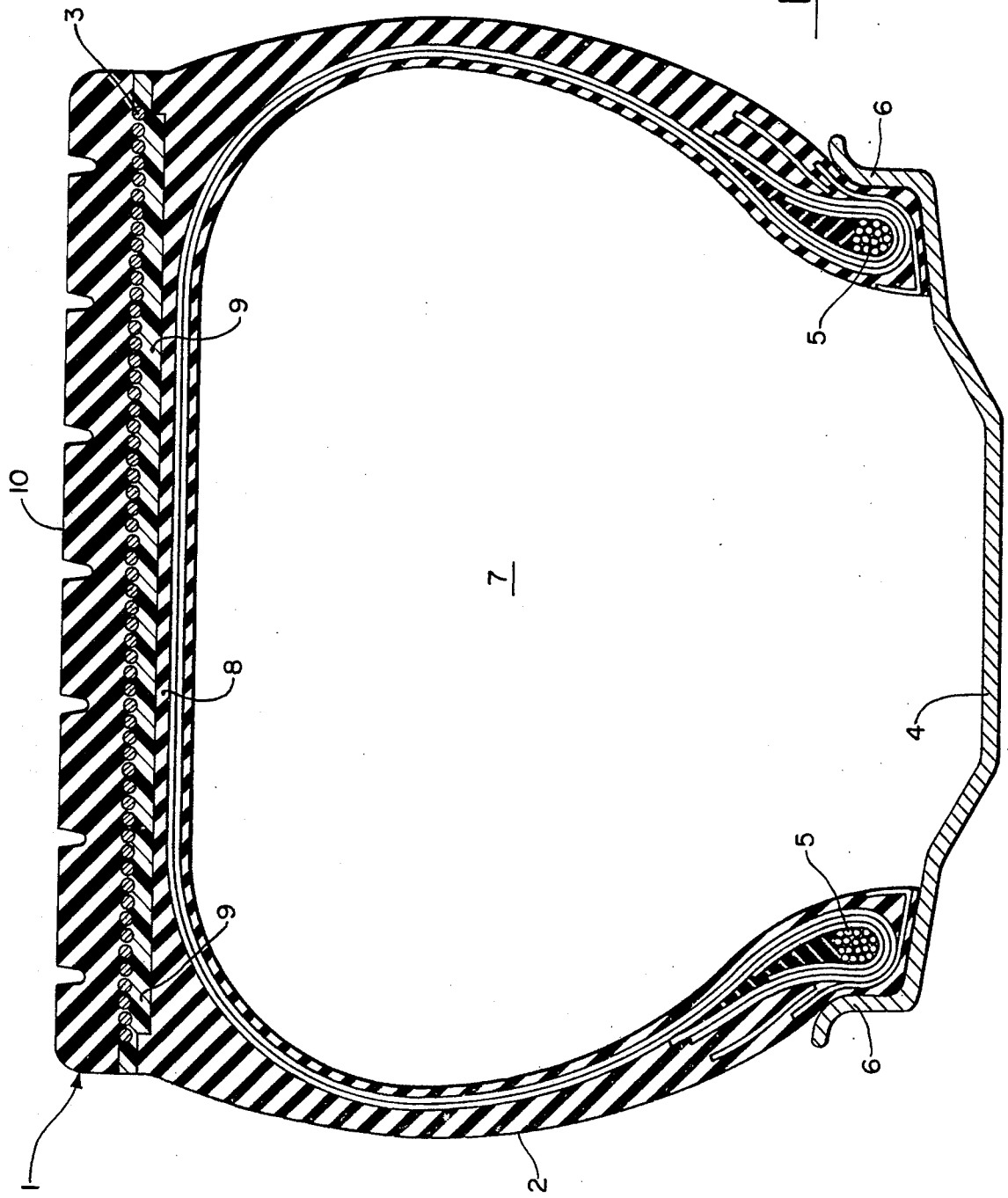

United States Patent [19]
Curtiss, Jr.

[11] 4,034,789
[45] July 12, 1977

[54] PNEUMATIC TIRE HAVING A REMOVABLE TREAD RING

[75] Inventor: Walter W. Curtiss, Jr., Brimfield, Ohio

[73] Assignee: The Goodyear Tire & Rubber Company, Akron, Ohio

[21] Appl. No.: 647,272

[22] Filed: Jan. 5, 1976

[51] Int. Cl.² .......................................... B60C 11/02
[52] U.S. Cl. ................................. 152/187; 152/190
[58] Field of Search .......... 152/169, 170, 172, 178, 152/179, 185, 187, 188, 189, 190, 191, 196, 209 R; 305/19, 54

[56] References Cited

U.S. PATENT DOCUMENTS

| 1,403,058 | 1/1922 | Pushee | 152/187 |
| 3,578,052 | 5/1971 | Petersons | 152/187 |
| 3,897,814 | 8/1975 | Grawey | 152/187 |

Primary Examiner—Drayton E. Hoffman
Attorney, Agent, or Firm—F. W. Brunner; J. D. Wolfe

[57] ABSTRACT

A pneumatic tire comprising a carrying case and a removable tread ring having an armor member resistant to tension in the longitudinal direction of said tread ring, said tread ring containing a layer of see-through elastomer covering the inside of the armor, a nondiscoloring polyurethane being the preferred see-through elastomer.

4 Claims, 2 Drawing Figures

PNEUMATIC TIRE HAVING A REMOVABLE TREAD RING

The present invention relates to a pneumatic tire in which the tread is separate from the carcass, and, more particularly, to such a tire wherein the tread is held on the carcass by means of the friction forces generated by the inflation pressure of the tire.

Still more particularly this invention relates to a tread ring for a pneumatic tire where the tread ring is held on the tire by the inflation pressure and the inside surface of the tread ring is of see-through elastomer.

In the art of removable tread tires, it is generally known to provide a group of reinforcing members in the tread ring, which reinforcing members usually include a tension-resisting armor one or more strips of textile fabric internal to said armor.

The tension-resisting armor is usually composed of a single helically wound metal cord, whose coils are disposed in a direction substantially parallel to the longitudinal direction of the tread, in order to withstand the expansion of the carcass and thus generate the friction forces able to anchor the tread ring on the carcass.

The strip of metal fabric usually disposed in a radially outward position with respect to the armor is normally utilized to protect the latter against punctures and ruptures due to impacts, and to distribute the concentrated stresses caused for example by a small obstacle engaging the wide portion of the tread. These outer strips have also a desirable effect on the transversal rigidity of the tread ring and therefore on the drift characteristics of the tire. To obtain the best results, at least two outer strips are utilized, in which case the cords of each pair are disposed along two directions crossed to each other and with respect to the midcircumferential plane of the tread ring. Moreover, these cords usually extend at angles ranging between 25° and 65°, and preferably between 30° and 50° with respect to the midcircumferential plane of the tread ring.

The inner textile strip of these known tires is normally utilized to maintain the coils of the armor in the right position during the manufacture of the ring, and to prevent the coils from cutting the underlying rubber layer in severe service condition. This inner textile strip is usually constituted by transversal cords forming angles of 90° with respect to the midcircumferential plane of the tread ring.

Although the results achieved with the above-described arrangement are quite desirable, the tread ring is usually relatively stiff, and difficult and expensive to manufacture.

I have discovered that one of the problems associated with use of a separate tread ring is that the reinforcing members, viz. the metal wire or polyamide cords of, for example, DuPont's Fiber B (sold by E. I. DuPont deNemours & Company as "Fiber B") of the polyamide type, during the shaping and curing of the tread ring tend to bunch together or some of the helix develop more tension than others and consequently the tread ring does not have uniform pressure exerted thereon by the carrying case or tire carcass when it is inflated. This causes slippage and excessive wear that can result in the failure of the carrying case.

I have discovered that the tread ring can be made with a clear or see-through elastomer covering the reinforcing member on the inside of the tread ring with the outside of the tread ring being made of a typical tread stock, viz. heavy carbon black loaded natural rubber or polybutadiene styrene rubber. The arrangement of the reinforcing members in the tread ring can be visibly inspected to make sure the reinforcing members have not bunched together or some helix has not tightened up to give uneven tension in the armor area.

Briefly, the tread ring of the present invention includes a helically wound metal cord or high tensile polyamide cord, the coils of which are disposed in the tread ring in a direction substantially parallel to the longitudinal direction thereof, and having a suitable tread stock on the outside of the ring and a clear, see-through elastomer on the inside of the ring.

Figure 2:
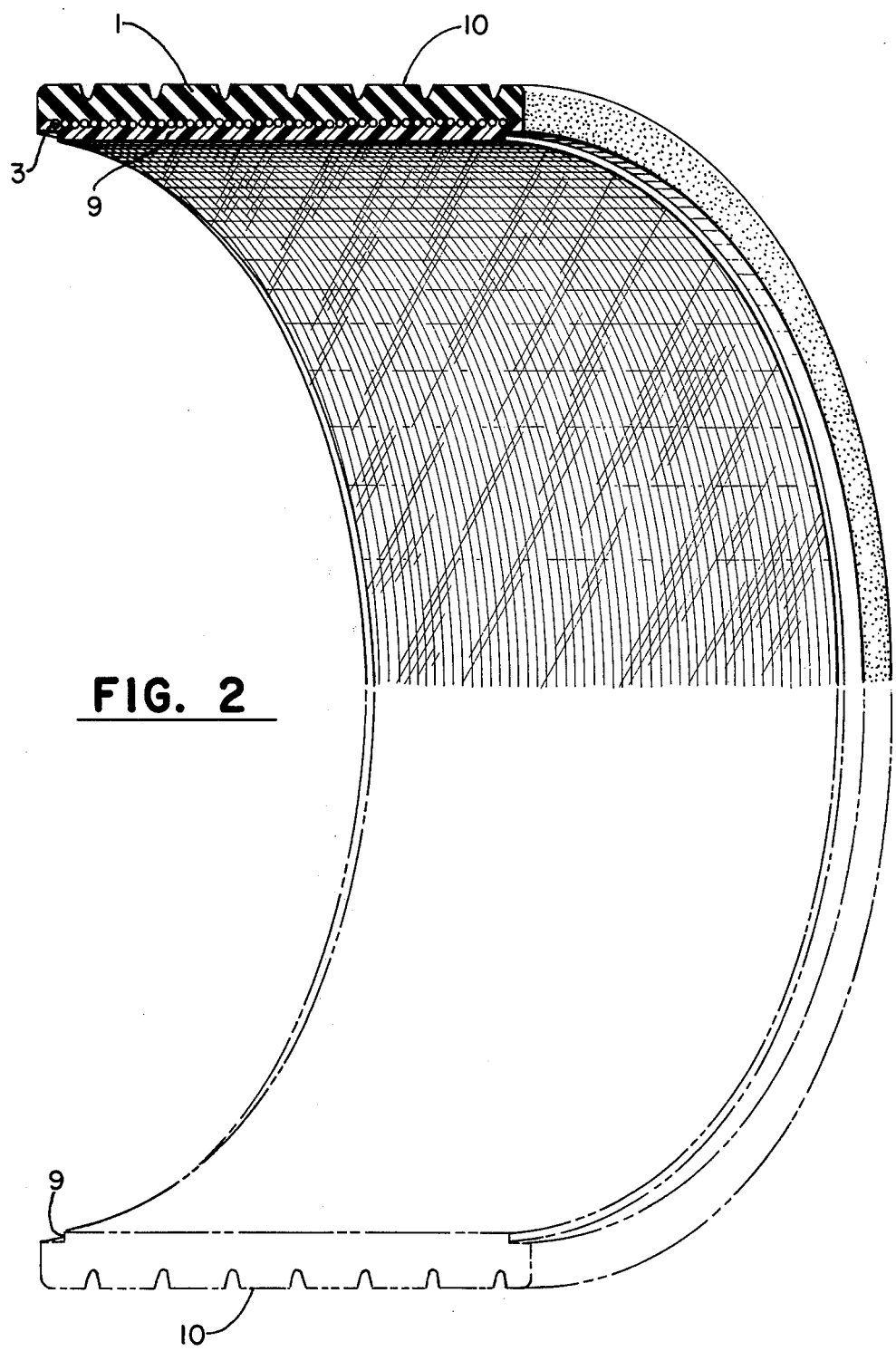

The present invention will be better illustrated and understood by reference to the attached drawings given by way of exemplification in which FIG. 1 is a cross-section through a pneumatic tire of this invention mounted on a rim; and FIG. 2 is a perspective view along line 2—2 of FIG. 1.

Referring specifically to FIG. 1 of the drawings, a removable tread tire is shown which consists of a tread ring 1, adapted to frictionally engage a carrying casing 2 by means of the inflation pressure of the tire. A truck tire is depicted for the purpose of illustration, it being understood that any size tire is within the scope of the invention and especially the off-the-road tire.

Inside the tread ring 1 there is disposed an armor 3 constituted by a metal cord helically wound up to form a single strip extending substantially across the width of the tire as shown in FIG. 1, the cords of the helix being disposed in a direction substantially parallel to the longitudinal direction of the tread ring as shown in FIG. 2. The metal cord may, for example, have formation and a diameter suitable for the specific tire being made.

Referring again to FIG. 1, the carrying case or tire carcass 2 is mounted into a rim 4 with the beads 5 seated within the rim flange 6. When the cavity 7 formed by the rim and tire carcass is pressurized by inflation with air the tread seat portion 8 of the tire carcass expands to lock the contact portion 9 of the tread ring 1 into operative contact with the tire carcass to give an operative tire.

In this invention the tread ring can be molded in the normal way by placing the wire on a precured and shaped tread ring composed of a tread stock such as, for example, a high abrasion carbon black loaded natural rubber or butadiene-styrene rubber with the tread ring being formed and preshaped to leave no elastomer extending above the wire or Fiber B cords of the polyamide type. Another way to make the tread ring 1 is to premold it with or without wire reinforcing members, where no wire is present, then it is wrapped on the premolded ring before the contact portion 9 of the ring is then formed of a clear see-through elastomer. Preferably the contact portion 9 of the ring is formed by casting or liquid injecting a polyurethane. It should be appreciated that the contact portion 9 could have lugs in the surface thereof to fit in grooves of the carrying case to give greater stability to the tread ring of the tire.

The liquid polyurethane can be any of the well known types such as gum stocks or liquid reaction mixtures which can be made by one shot, prepolymer or quasiprepolymer methods from a reactive hydrogen material of 1000 to 6000 molecular weight such as polyester glycol or polyether glycol, an organic polyisocyanate and a curative of a low molecular weight polyol, alcoholamine or polyamine types. The nondiscoloring polyurethanes which contain no nitrogen attached to a benzenoid carbon atom are especially desirable as they resist discoloration better than the polyurethanes made with aromatic diisocyanates such as TDI or MDI and aromatic polyamines such as MOCA or MDA.

A carrying casing made of black loaded butadiene styrene rubber according to the general teachings of U.S. Pat. No. 3,557,858 was fitted with a tread ring made by casting a polyurethane reaction mixture in a mold having an epoxy resin treated bronze wire wound helix fashion therein to give an armor portion 3. The tread or ground contact portion 10 of the tread ring was formed of a prepolymer of toluene diisocyanate and a polytetramethylene either glycol cured with methylene dichloroaniline (MOCA) and the contact portion 9 of the tread ring was made of a prepolymer of hydrogenated methane di(phenyl isocyanate) and polytetramethylene ether glycol of about 2000 molecular weight and cured with 2,2'-dithio dianiline. The contact portion 9 was clear enough to permit the wires to be observed and if the wires were not uniformly distributed in the tread the tread could be rejected without ruining the more expensive carrying case in service. A tire made in this manner performed satisfactorily under test conditons.

To further illuminate the invention and its advantages a tread ring was made with a dark or carbon black containing polyuretahne in the outer area, a helically wound steel wire armorer and a nondiscoloring polyurethane inner surface over the steel wire. This tread ring was examined by observation and X-ray to determine that the wire was properly spaced and positioned in the ring. Then the tread ring was placed on the carrying case and the carrying case was inflated to lock the tread on the carrying case to give a complete pneumatic tire. If desired, the tread ring and carrying case can be made with a tongue and groove arrangement or a lug and groove arrangement to aid in locking the tread ring and carrying case together under inflation conditions. After the tread ring and carrying case have been operated for some time in the field, the carrying case can be deflated and the tread ring can be removed and inspected through the see-through elastomer layer without having to return the ring to where X-ray facilities were available.

While certain representative embodiments and details have been shown for the purpose of illustrating the invention, it will be apparent to those skilled in this art that various changes and modifications may be made therein without departing from the spirit or scope of the invention.

What is claimed is:

1. In a vehicle tire comprising an inflatable tire carcass adapted to receive a removable tread ring in locked relationship under inflated conditions, said ring including an armor of metallic or polyamide members to provide resistance to tension in a longitudinal direction of the ring, the improvement wherein the tread ring has a layer of see-through elastomer suitable for use in a tire covering the inside of the armor to permit the position of each member to be determined 2. The pneumatic tire of claim 1 wherein the armor is composed of spirals of helically wound metallic members and the see-through elastomer is a polyurethane.

3. The pneumatic tire of claim 1 wherein the polyurethane of the see-through elastomer is a nondiscoloring polyurethane.

4. A method of inspecting a pneumatic tire which includes a carrying case and a tread ring having a see-through elastomer layer over the armor in said tread ring, said armor containing metallic or polyamide members to produce resistance to tension in a longitudinal direction of said ring, comprising deflating the carrying case, removing the tread ring and inspecting the armor through said see-through elastomer layer to determine the spacing and position of the members in the armor.

* * * * *